United States Patent Office 3,352,823
Patented Nov. 14, 1967

3,352,823
PROCESS FOR CURING EPOXY RESINS
WITH METHYL POLYBORATE
Daniel T. Haworth, Milwaukee, and Gilbert F. Pollnow, Oshkosh, Wis., assignors to Allis-Chalmers Manufacturing Company, Milwaukee, Wis.
No Drawing. Filed Oct. 3, 1961, Ser. No. 142,526
4 Claims. (Cl. 260—46.5)

The present invention relates generally to the manufacture of epoxy resins and more particularly to compositions, processes and products employing boron-containing inorganic polymers to provide flexible resinous products having high heat distortion temperatures.

As is well known, the three membered ring of the epoxide group is highly reactive. The ring opening normally occurs upon treatment of the epoxy resin with a reagent having the propensity to disrupt a carbon-oxygen linkage in the ring and to polymerize to the broken linkage to form a resinous product. Polymerization may result in linear polymers or cross-linked resins depending upon the functionality of the reagent. In the latter case, these reagents are called "curing agents" or "hardening agents."

"Epoxy resins," as that term is used herein, define those partially polymerized organic compounds having a 1,2 epoxy equivalency of greater than unity.

"Epoxy equivalency," as used herein, means the number of 1,2 epoxy groups, viz.,

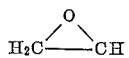

contained in the average molecule of a given compound. Where a substantially pure compound is used, such for example as the diglycidyl ether of epichlorohydrin and bisphenol A, i.e., bis-(4-hydroxyphenyl) dimethyl methane, the epoxy equivalent will be the integer two. In the more general case where the "compound" consists of a mixture of molecules having differing molecular weights and differing numbers of epoxy groups, the epoxy equivalent will of necessity be greater than unity and not necessarily an integer. For example, a glycidyl ether particularly suitable in the practice of the present invention as shall hereinafter appear is the reaction product of reacting bis-(4-hydroxyphenyl) dimethyl methane (bisphenol A) with epichlorohydrin in the presence of an alkali according to the reaction:

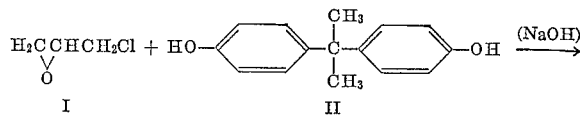

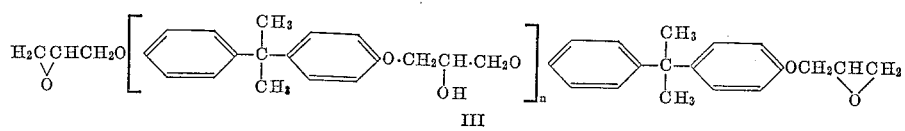

Thus, if two moles of I are mixed with one mole of II, the product III will on the average contain two epoxy groups per molecule (one at each end) and its epoxy equivalent will be 2. However, if a 1:1 mole ratio of reactants is used, the product will have an average of only 1 epoxy equivalent per molecule. This latter mixture will not be a product usable in the present invention for, as indicated above, to be an epoxy resin in terms of this invention, the epoxy equivalent must be greater than 1.

The glycidyl ethers used in this invention may contain the elements: carbon, hydrogen, oxygen and silicon. They include the 1,2 epoxy polyethers of such polyhydric alcohols as ethylene glycol, propylene glycol, trimethylene glycol, diethylene glycol, triethylene glycol, glycerol, dipropylene glycol, 1,2 tetramethyl disilanol and the like.

It is further found that the more recent commercial epoxy resins derived from the peracetic acid epoxidation of olefins can also be used. An example of this type of resin is "Epoxide 201," manufactured by Union Carbide, New York, N.Y. Chemically, "Epoxide 201" is 3,4 epoxy 6 methyl cyclohexylmethyl 3,4 epoxy 6 methyl cyclohexylmethyl 3,4 epoxy 6 methyl cyclohexanecarboxylate. The Epoxide 201-type resins are of the so-called "quick setting" type resins and, while they require prompt handling, the curing agents of the present invention, as shall appear, are quite effective with these also.

In addition, the mechanism of the present invention provides a highly desirable product when reacted with epoxy siloxanes, such, for example, as 1,3 bis [3 (2,3 epoxy propoxy) propyl] tetramethyl disiloxane which is manufactured and sold by the Dow Corning Corporation under the trade name "Syl Kem 90."

In this description, epoxy resins will be exemplified by Epon 828, an epoxy resin manufactured by the Shell Chemical Company of Chicago, Ill.

Epon 828 is diglycidyl ether formed by reacting bisphenol A and epichlorohydrin. It has the general chemical structure indicated by III in the equation set forth above where $n$ may be 0, 1, 2, etc.

Epon 828 is commercially comparable to Dow 331 (manufactured by the Dow Chemical Company, Midland, Mich.), Epi-Rez 510 (manufactured by the Jones-Dabney Company, Louisville, Ky.), Bakelite ERL 2774 (manufactured by Union Carbide and Carbon Company, New York, N.Y.), and Araldite 6010 (manufactured by Ciba Company, Inc., Plastics Division, Kimberton, Pa.). For purposes of this disclosure, these and like type epoxy resin formulations may be considered interchangeable. By and large, this type of resin makes up the bulk of the liquid epoxy resins manufactured and sold in the United States.

Epoxy resins have heretofore been cured with various organic substances including the primary and secondary polyamines, the tertiary amines, organic acids, organic acid anhydrides and, more recently, with borontrifluoride-amine complexes. The use of these materials has, however, not been entirely satisfactory in the production of cured resins having high heat distortion temperatures and flexibility.

Heretofore boron trifluoride (a Lewis acid type of compound) has been used to cure the epoxy resin when high heat distortion temperatures are desired. The values obtained imply that a very high order of homopolymerization occurs and that the cross-linked structure is quite tight. This procedure provides a polymer which is quite different from that produced with the tertiary amine catalysts since the tertiary amine catalysts, at normal concentrations, produce polymers having low heat distortion points, generally in the range of 100° C.

$BF_3$ has the inherent disadvantage, however, in that it provides a cured resin which is quite brittle. Consequently, it is frequently necessary to add polyols to the resin-curing agent system to increase its toughness at the expense of the heat distortion temperature.

It thus becomes apparent that a need exists which will permit the production of cured epoxy resins which have both high heat distortion temperatures as well as a practical degree of flexibility.

Because of this unfilled need, the work resulting in the present invention was initiated.

Accordingly, one of the prime objects of the present invention is to provide an improved cured epoxy resin characterized by both flexibility and high heat distortion temperatures.

Another object of the present invention is to provide an improved process in which organic and inorganic polymers are caused to react to provide a flexible polymer characterized by high heat distortion temperatures.

A still further object of the present invention is to provide an improved curing agent for epoxy resins which is an inorganic polymer and contains boron as an essential ingredient.

Still another object of the present invention is to provide an improved process in which an epoxy resin is cured by a boron-containing inorganic polymer to create a cured resin exhibiting improved physical properties.

Still another important object of the present invention is to provide improved curing agents for epoxy resins which are characterized by their homogeneity when mixed therewith and a dual propensity to also serve as a plasticizing agent.

A still further object is to provide improved curing agents which, when employed with epoxy resins, provide an easily handled system for the production of dimensionally stable polyethers.

These and still further objects as shall hereinafter appear, are fulfilled by the present invention in a remarkably unexpected fashion as will be readily discerned from a careful consideration of the following detailed description of embodiments exemplifying several salient aspects of the invention.

In the following description, the unique boron-containing inorganic polymer of the present invention will be methyl polyborate. Two types of methyl polyborate are available from the Pacific Coast Borax Company on an experimental basis. The characteristics of the two are reported in Table I.

TABLE I

| Characteristic | Type I | Type II |
|---|---|---|
| Formula | A mixture of high methyl borates and trimethoxy-boroxine. | $[(CH_3O)_3 B]_2(B_2O_3)_3$. |
| Percent B (typical) | 19.66 | 20.77. |
| Density at 25° C | 1.27 | 1.31. |
| Refractive index ($N_D^{25°}$) | 1.4138 | 1.4135. |
| Viscosity (centistokes at 25° C.) | 935 | 22,350. |
| Decomposition point | about 135° C | about 165° C. |
| Flash point (C.O.C.) | 135° F | 170° F. |
| Color | Pale yellow liquid | Pale yellow liquid. |

In addition, both smell similar to trimethyl borate, are very soluble in acetone, diethyl ether and benzene, are partially soluble in chloroform and carbon tetrachloride, are only slightly soluble in petroleum ether (B.P. 20°–40°), and hydrolyze readily when contacted with water or moist air.

For purposes of brevity, the resins hereinafter described will be Shell's Epon 828 (identified above) although the techniques herein described have proven themselves satisfactory for use with peracetic acid resins (e.g., Union Carbide's EP–201) and the epoxy siloxanes (e.g., Dow Corning's "Syl Kem 90," identified above) as well.

One practice of the present invention comprises admixing, with slight stirring, a quantity of the boron-containing inorganic polymer with a quantity of epoxy resin.

Generally, it is found that best results are obtained when the invention is practiced with quantities of from about 2 to about 20 parts (by weight) of the inorganic polymer, e.g., methyl polyborate, per 100 parts of the epoxy resin.

The mixture is fluid and quickly obtains substantially complete homogeneity upon slight preheating. The mixture maintains a pot life, at room temperature, of approximately thirty minutes.

After mixing, the liquid is poured into a suitable mold and cured in a manner hereinafter more fully described.

As a convenient method of determining high temperature stability, the cured samples of the cast polymer are subjected to a heat distortion temperature test. In this test, the temperature at which the specimen deflects 0.010 inch under a fiber stress of 264 p.s.i. is designated as its heat distortion temperature (HDT). The procedure is defined in the ASTM Standards on Plastics, D648–45T. Data obtained from these tests is reported below.

In another practice of the invention, the boron-containing inorganic polymer, e.g., methylpolyborate-II, is admixed, in the proportions indicated, with the resin. The admixture is heated slightly and stirred to provide a homogeneous fluid which is then cast into suitable molds. The castings were initially cured at 150° C. for about 2 hours and thereafter subjected to a post cure at 200° C. The duration of the post cure was varied for the several samples. As appears from the data in Table II below, a post cure of at least 4 hours is desired; although, after about 12 hours for most mixtures, little benefit is derived.

TABLE II.—HEAT DISTORTION TEMPERATURES OF EPON 828—METHYL POLYBORATE II SYSTEM

[All samples received an initial cure of 2 hours @ 150° C.]

| MPB-II (phr.) | Post cure @ 200° C. (hrs.) | HDT (° C.) |
|---|---|---|
| 8 | 4 | 118 |
| 8 | 8 | 152 |
| 8 | 12 | 153 |
| 8 | 16 | 154 |
| 8 | 20 | 153 |
| 10 | 4 | 113 |
| 10 | 8 | 144 |
| 10 | 12 | 154 |
| 10 | 16 | 155 |
| 10 | 20 | 154 |
| 12 | 4 | 110 |
| 12 | 8 | 142 |
| 12 | 12 | 148 |
| 12 | 16 | 156 |
| 15 | 4 | 107 |
| 15 | 8 | 124 |
| 15 | 12 | 143 |
| 15 | 16 | 146 |
| 15 | 20 | 152 |
| 20 | 4 | 103 |
| 20 | 8 | |
| 20 | 12 | |
| 20 | 16 | |
| 20 | 20 | 143 |

In another practice of the present invention, twelve parts (by weight) of methyl polyborate-II (MPB–II) were mixed with 100 parts of Epon 828 while stirring over a slight heat. The admixture was then cast and the casting was initially cured at 150° C. for about 2 hours. The initially cured casting was then post cured at about 200° C. for 20 hours. Twenty hours were used even though, as indicated, it was greater than necessary, simply because it was a convenient duration involving two work days. The electrical properties of the resulting polymer are reported in Table III and were determined in accordance with ASTM test for dielectric constant and loss characteristics (D150–54).

TABLE III.—ELECTRICAL PROPERTIES OF POLYMER PREPARED FROM 12 PHR. MPB II-EPON 828

| Frequency | Dielectric Constant | Dissipation Factor |
|---|---|---|
| $10^2$ | 3.60 | 0.0033 |
| $10^3$ | 3.57 | 0.0029 |
| $10^4$ | 3.56 | 0.0044 |
| $10^5$ | 3.54 | 0.0068 |

In still another practice of the present invention, twenty parts (by weight) of MPB–II were admixed with 100 parts of Epon 828 while stirring over a slight heat. The admixture was then cast and the casting was cured, first at 150° C. for 2 hours and then at 200° C. for 20 hours. The electrical properties of the resulting polymer are reported in Table IV.

TABLE IV.—ELECTRICAL PROPERTIES OF POLYMER PREPARED FROM 20 PHR. MPB II-EPON 828

| Frequency | Dielectric Constant | Dissipation Factor |
|---|---|---|
| $10^2$ | 3.46 | 0.0033 |
| $10^3$ | 3.40 | 0.0031 |
| $10^4$ | 3.42 | 0.0046 |
| $10^5$ | 3.34 | 0.0092 |

A master batch was prepared from twelve parts (by weight of MPB–II and 100 parts of Epon 828. The samples 1 and 2 were cast in open molds while samples 3 and 4 were cast in closed molds. All castings received an initial cure at 150° C. for 4 hours followed by a post cure at 200° C. for an additional 4 hours. The weight loss test was performed with samples of 5 x 1.5 x 0.35 cm. which were placed in open glass containers in a constant draft oven heated to 200° C. The weight loss data is reported in Table V. All tests were in conformance with ASTM test D543–52T.

TABLE V

| Sample No. | Weight Loss (percent) at 200° C. After— | | | | |
|---|---|---|---|---|---|
| | 1 day | 2 days | 3 days | 4 days | 7 days |
| 1 | 1.05 | 1.28 | 1.38 | 1.46 | 1.79 |
| 2 | 0.94 | 1.12 | 1.27 | 1.37 | 1.77 |
| 3 | 0.85 | 1.03 | 1.24 | 1.37 | 1.74 |
| 4 | 0.68 | 0.90 | 1.10 | 1.25 | 1.43 |

Chemical resistance tests were performed on samples prepared as above from the same master batch. The humidity test was run at 100° F. for 24 hours with 100 percent humidity. The acid test was performed by submerging the samples in 30 percent sulfuric acid ($H_2SO_4$) for seven days at room temperature. The caustic test was performed by submerging the samples in 10 percent sodium hydroxide (NaOH) for seven days at room temperature. The data obtained is reported in Table VI.

TABLE VI.—CHEMICAL PROPERTIES OF POLYMER PREPARED FROM 12 PHR. MPB II-EPON 828

[Weight comparison: After test to before]

| Test | Sample No. | | | |
|---|---|---|---|---|
| | 1 | 2 | 3 | 4 |
| Humidity | 0.83 | 0.78 | 1.00 | 1.02 |
| Acid | 0.81 | 0.79 | 0.80 | 0.84 |
| Caustic | 1.20 | 0.79 | 1.22 | 1.16 |

All of the foregoing mixtures, when formed in samples having 1–2 mm. thickness, were capable of being bent into a 45° angle without fracture. This is a generally acceptable test for flexibility.

From the foregoing it becomes apparent that an improved curing agent-resin system has been developed which fulfills all of the aforestated objectives to a remarkably unexpected extent. It is of course understood that modifications and alterations of master batch formulations or variations in curing cycle may be effected to meet special needs for the resultant polymer without departing from the spirit of this disclosure.

An additional important aspect of the present invention shall now be described.

We have discovered, in our extensive work with polyborates as reagents fo repoxy resins, that the curing action between the polyborate and the resin may be significantly moderated by the introduction of primary, secondary or tertiary amines to the resin-polyborate admixture. Thus, the addition of such reagents as ethylamine, dibutylamine, pyridine and the like has the rather surprising effect of retarding and even arresting the curing action. This is indeed surprising when one realizes, as previously indicated, that these amines are curing agents in their own right and could, therefore, be reasonably expected to accentuate rather than retard the curing action.

Even with the quick-setting resins such as Epoxide 201, an admixture of 0.55 gm. of methyl polyborate-I and 5.5 grams of Epoxide 201 remains liquid over an extended period of time upon the addition of only about 0.2 gram of dibutylamine. It is believed that the most effective moderation is achieved upon the addition of a mole equivalent of the unreacted polyborate in the admixture as is borne out by the data reported in Table VII. It should be noted that the resin employed in these reactions was Epoxide 201, a quick-setting resin, and not Epon 828 as was reflected in the data above. In each instance, the samples cured dry and hard at 150° C. after 30 minutes.

TABLE VII.—TIME OF GELATION

| Sample No. | MPB (I) (gms.) | Bu$_2$NH (gms.) | Epoxide 201 (gms.) | B/N | Viscosity (cs.) | Time of gelation (min.) |
|---|---|---|---|---|---|---|
| 21 | 0.55 | 0 | 5.5 | ∞ | ∞ | 3 |
| 22 | 0.55 | 0.071 | 5.5 | 9 | ∞ | 15 |
| 23 | 0.55 | 0.11 | 5.5 | 6 | ∞ | 30 |
| 24 | 0.55 | 0.213 | 5.5 | 3 | 860 | (*) |
| 25 | 0.55 | 0.316 | 5.5 | 2 | 795 | (*) |
| 26 | 0.55 | 0.632 | 5.5 | 1 | 470 | (*) |
| 27 | 0.55 | 1.26 | 5.5 | 0.5 | 111 | (*) |

* Still liquid after 10,080 minutes.

From the foregoing it becomes apparent that an improved curing agent epoxy resin system has been described which fulfills all of the aforestated objectives to a remarkably unexpected extent. It is, of course, understood that modifications and alterations of master batch formulations and/or variations in the curing cycle may be effected to meet special problems and transmit specific properties to the resulting polymer without departing from the spirit of the present invention.

It is further understood that modifications of the compositions or the processes, or products, herein described, by addition of other reagents thereto or in any other fashion as may readily occur to the artisan when confronted with this disclosure is likewise within the spirit hereof especially as it is defined by the scope of the claims appended hereto.

Having now particularly described and ascertained the nature of our said invention and the manner in which it is to be performed, we declare that what we claim is:

1. A process for curing an epoxy resin having a 1,2-epoxy equivalency of greater than unity which comprises reacting said epoxy resin with a curing agent having the general formula $$[(CH_3O)_3B]_2(B_2O_3)_3$$

2. The process of claim 1 wherein the epoxy resin is selected from the group consisting of the polyglycidyl ethers of bis-(4-hydroxyphenyl)-dimethyl methane, 1,3-bis [3(2,3-epoxy propoxy) propyl] tetramethyl disiloxane and 3,4-epoxy-6-methyl cyclohexylmethyl 3,4-epoxy-6-methyl cyclohexane carboxylate.

3. The process of claim 1 wherein the reaction is heated to about 150° C. for about 2 hours.

4. The process of claim 3 wherein the reaction is heated for at least an additional 4 hours at about 200° C.

References Cited

UNITED STATES PATENTS 2,809,184  10/1957  Langer _____ 260—49
3,025,249  3/1962  Chen _____ 260—47

FOREIGN PATENTS 824,251  11/1959  Great Britain.

WILLIAM H. SHORT, *Primary Examiner.*

T. D. KERWIN, H. D. ANDERSON,
*Assistant Examiners.*